Patented May 22, 1951

2,553,778

UNITED STATES PATENT OFFICE 2,553,778

PARASITICIDAL COMPOSITIONS CONTAINING REACTION PRODUCTS OF MERCAPTO ACETIC ACID ESTERS AND PERCHLOROMETHYLMERCAPTAN

Roger S. Hawley, Linden, N. J., assignor to Standard Oil Development Company, a corporation of Delaware No Drawing. Application December 1, 1949, Serial No. 130,604

12 Claims. (Cl. 167—22)

This invention relates to new and useful improvements in parasiticidal preparations and more particularly to improved fungicides and insecticides. This invention also relates to methods of protecting organic material subject to attack by low orders of organisms. More specifically, this invention relates to the preparation of new chemical compounds, the reaction products of mercapto acetic acid esters with perchloromethylmercaptan.

It has now been found that the reaction products of mercapto acetic acid esters with perchloromethylmercaptan correspond to the following general formula, Formula I below:

Formula I $Cl_3CSSCH_2COOR$ where R is a hydrocarbon radical, such as, alkyl, aryl, aralkyl, alicyclic, etc., are extremely effective for checking the growth of insects and fungi. These compounds may thus be used as novel ingredients of parasiticidal compositions.

Compounds wherein the R radical is an alkyl radical are especially effective. Particularly effective and desirable compounds of the class of compounds of this invention are those in which the R radical is an alkyl radical having from 2 to 12 carbon atoms.

Among the particular compounds usable for the purpose of this invention are those in which the R radical comprises one of the following: ethyl, dodecyl, octadecyl, hexadecyl, decyl, octyl, iso-octyl, butyl and isopropyl. Mixtures of these compounds can also be employed.

The compounds of this invention, which are usually liquid, and are believed to be novel, are prepared in general by the condensation reaction of perchloromethylmercaptan with the corresponding mercapto acetic acid ester. The general method of preparation is to add the perchloromethylmercaptan dropwise or slowly to the proper mercapto acetic acid ester alone or in a suitable solvent.

Formula II represents the reaction between ethyl thioglycolate and perchloromethylmercaptan:

Formula II $HSCH_2COOC_2H_5 + ClSCCl_3 \rightarrow Cl_3CSSCH_2COOC_2H_5 + HCl$

The mercapto acetic acid ester, as stated above, may first be dissolved in a suitable solvent such as benzene, toluene, heptane or dioxane. An approximately equimolar amount of perchloromethylmercaptan is then added with stirring, while the temperature is maintained at about atmospheric. The desired product is then concentrated by evaporation of the solvent.

The preparation of the mercapto acetic acid esters used as reactants is well known in the art and need not be given here.

The following examples are given to illustrate this invention and include both the preparation of the reaction products of mercapto acetic acid esters with perchloromethylmercaptan and test results obtained on the active compounds employed as parasiticides.

EXAMPLE 1

*Preparation of the reaction product of ethyl thioglycolate and perchloromethylmercaptan*

120.2 gms. (1.0 mole) of ethyl thioglycolate was placed in a 1 liter 3-necked flask, fitted with a stirrer, thermometer and dropping funnel. While stirring, 186.0 gms. (1.0 mole) of perchloromethylmercaptan was added dropwise. A cooling bath was used and the rate of addition was controlled so that the temperature did not rise above 15° C. HCl gas evolved from the solution as the perchloromethylmercaptan was added. Stirring was continued for about six hours after the perchloromethylmercaptan had been added, after which the solution was left to stand overnight. The solution was then placed in a separatory funnel and diethyl ether was added, after which it was water washed several times and neutralized with NaHCO₃ solution. The diethyl ether extract was dried with anhydrous Na₂SO₄ and filtered. The diethyl ether was evaporated from the extract on the steam bath and 223 gms. of light amber colored, clear, liquid product was obtained. The product was placed in a Claisen flask and 200 ml. of xylene was added. The solution was then stripped at 2 mm. pressure up to 130° C. bath temp. in order to remove the xylene and traces of unreacted perchloromethylmercaptan. 218 gms. of product was obtained.

EXAMPLE 2

*Preparation of the reaction product of dodecyl thioglycolate and perchloromethylmercaptan*

105.8 gms. (0.4 mole) of dodecyl thioglycolate was placed in a 500 ml. 3-necked flask, fitted with a stirrer, thermometer and dropping funnel. While stirring, 80.0 gms. (0.4 mole) of perchloromethylmercaptan was added dropwise. The rate of addition was controlled so that the temperature did not rise above 50° C. Hcl gas evolved from the solution as the perchloromethylmercaptan was added. Stirring was continued for about 2 hours after the perchloromethylmercaptan had been added, after which the solution was left to stand overnight. The solution was then placed in a separatory funnel and diethyl ether was added, after which it was water washed several times and neutralized with $NaHCO_3$ solution. The diethyl ether extract was dried with anhydrous $Na_2SO_4$ and filtered. The diethyl ether was evaporated from the extract on the steam bath and 127.5 gms. of light amber colored, clear, liquid product was obtained. The product was placed in a Claisen flask and 100 ml. of xylene was added. The solution was then stripped at 3 mm. pressure up to 100° C. bath temp. in order to remove the xylene and traces of unreacted perchloromethylmercaptan. 124.5 gms. of product was obtained.

EXAMPLE 3

The compounds prepared in Examples 1 and 2 were tested for parasiticidal activity. The values given in column I of the following table represent the percentage mortality of the test insects after 96 hours following a two-minute immersion in an 0.25% aqueous solution or suspension of the test compound.

The results in column II are given as per cent mortality of the test insect after 96 hours following bloodstream injection of 0.002 cc. of a 5% solution of the test compound.

The Slide Germination technique for fungicidal testing was carried out as described by Wellman and McCallan (Contributions of Boyce Thompson Institute, vol. 3, No. 3, pages 171–176) and is listed in column III as concentration of test compound in per cent to give an LD–50.

sions and consequent uniformity of dispersion in the resulting colloidal system. The use of these wetting agents also increases the spreading action of the spray by decreasing the surface tension of the liquid carrier. This results in the securing of better contact of the spray with the surface being treated, and consequently brings the active ingredient into intimate contact with the parasite life. The concentration of active ingredient in the aqueous emulsions varies with the insect pests to be treated. In general, the aqueous emulsion contains about 5% active ingredient, and 1% wetting agent by weight. Thus, a typical emulsion concentrate formulation consists of 83% $Cl_3CSSCH_2COOR$ and 17% petroleum sulfonate of about $C_{10}$–$C_{20}$ length by weight. This mixture can then be diluted with about 94 parts of water to 6 parts of concentrate.

The active compounds of this invention may also desirably be made up in solid compositions. A dust composition containing about 5% active ingredients is made up by admixing the active compounds with clays such as fuller's earth, china clay, kaolin, or bentonite. Solid wettable powders for aqueous dispersion contain about 25–50% active ingredient, 50–75% clay, and about 1% wetting agent. Clay itself also acts as a spreading agent.

The term "dispersing agent" is consequently used hereafter to connote generically, the various "emulsifying agents," "wetting agents" and "spreading agents" including clays that are adapted to be admixed with the active compounds of this invention in order to secure better wetting and spreading of the sprays of the active ingredients in liquid vehicles in which they are insoluble. (See Frear, "Chemistry of Insecti-

|  | Column I | | Column II | | Column III | |
| --- | --- | --- | --- | --- | --- | --- |
|  | Contact Insecticidal Activity, Per Cent Kill | | Bloodstream Insect. Activity, Per Cent Kill *Periplanitus Americana* (American Roach) | | Fungicidal Inhibiting Concentration, Per Cent | |
|  | *Blattella germanica* (German Roach) | *Omelpeltus sociatus* (Milk Weed Bug) | Female | Male | *Alterneria solania* | *Sclerotinia fructicola* |
| $Cl_3CSSCH_2COOC_2H_5$ | 100 | 100 | 100 | 100 | 0.0001 | 0.0001 |
| $Cl_3CSSCH_2COOC_{12}H_{25}$ | 100 | 100 | 80 | 40 | 0.01–0.001 | 0.01–0.001 |
| Bordeaux |  |  |  |  | 0.001 Cu | 0.001 Cu |

These figures indicate that the compounds of this invention possess both excellent insecticidal as well as excellent fungicidal activity.

The new compounds of this invention may thus be applied to parent materials to retard or prevent fungus growth and mildew formation. Some of the parent materials to which they may be applied for protective purposes are leather, wood, fur, wool, coated fabrics, and other substances.

The compounds of this invention which in most cases are liquids, are best distributed in the form of sprays such as in aqueous dispersions or dust compositions of the active ingredient with a powdered clay.

Since the novel compounds of this invention are insoluble in water, it is preferable to use them admixed with wetting or emulsifying agents so as to be able to secure aqueous emulcides, Fungicides, and Herbicides," second edition, page 380.)

Among the water-soluble wetting agents that can be used are the sulfates of long-chain alcohols such as dodecanol up to octadecanol, sulfonated amide and ester derivatives, sulfonated aromatic and mixed alkyl-aryl sulfonate derivatives, esters of fatty acids such as the ricinoleic acid ester of sorbitol, and petroleum sulfonates of $C_{10}$–$C_{20}$ length. The non-ionic emulsifying agents such as the ethylene oxide condensation products of alkylated phenols may also be used.

Solvents for the compounds of this invention may be utilized as auxiliary agents if desired. Among the solvents for the compounds of this invention are benzene, heptane, dioxane, acetone, ethanol, etc.

The compounds of this invention may also be admixed with carriers that are themselves active, such as other parasiticides, hormones, herbicides, fertilizers, and wetting agents. Stomach and contact insecticides such as the arsenates, fluorides, rotenone, and the various fish poisons and organic insecticides, such as di(p-)chlorophenyl-trichloroethane, benzene-hexachloride, and similar products may also be advantageously added. Mixtures of the active compounds of this invention may also be used.

The reaction products of mercapto esters and perchloromethylmercaptan, having the formula $RCOO(CH_2)_xSSCCl_3$, where R is a hydrocarbon radical and $x$ is an integer, also possess parasiticidal activity. These compounds can be prepared by esterifying a carboxylic acid with a mercapto alcohol such as mercapto ethanol and then reacting the mercapto ester with perchloromethylmercaptan.

It is to be understood that the invention is not limited to the specific examples which have been offered merely as illustrations, since other derivatives can be prepared, and that modifications may be made without departing from the spirit of the invention.

What is claimed is:

1. As new chemicals, the reaction products of mercapto acetic acid esters and perchloromethylmercaptan corresponding to the general formula:

$$Cl_3CSSCH_2COOR$$

wherein R is an alkyl radical having from 2 to 12 carbon atoms.

2. As a new chemical, the compound corresponding to the formula:

$$Cl_3CSSCH_2COOC_2H_5$$

3. As a new chemical, the compound corresponding to the formula:

$$Cl_3CSSCH_2COOC_{12}H_{25}$$

4. A parasiticidal emulsion concentrate comprising the compound corresponding to the formula:

$$Cl_3CSSCH_2COOC_2H_5$$

admixed with a petroleum sulfonate of about $C_{10}$–$C_{20}$ length, said petroleum sulfonate being present in an amount of about ⅕ by weight of the active chemical compound.

5. A parasiticidal dust composition comprising the reaction product of a mercapto acetic acid ester and perchloromethylmercaptan, corresponding to the general formula:

$$Cl_3CSSCH_2COOR$$

wherein R is an alkyl radical having from 2 to 12 carbon atoms, admixed with powdered bentonite.

6. A parasiticidal composition comprising the reaction product of a mercapto acetic acid ester and perchloromethylmercaptan, corresponding to the general formula: $Cl_3CSSCH_2COOR$ wherein R is an alkyl radical having from 2 to 12 carbon atoms as the active ingredient, admixed with an emulsifying agent which lowers the surface tension of water and thereby promotes aqueous emulsions of the active ingredient.

7. A composition as in claim 6 in which the emulsifying agent is selected from the group consisting of long chain alcohol sulfates, sulfonated amide derivatives, sulfonated ester derivatives, sulfonated aromatic derivatives, sulfonated alkyl-aryl derivatives, and petroleum sulfonates of $C_{10}$ to $C_{20}$ length.

8. A parasiticidal composition comprising the reaction product of a mercapto acetic acid ester and perchloromethylmercaptan, corresponding to the general formula: $Cl_3CSSCH_2COOR$ wherein R is an alkyl radical having from 2 to 12 carbon atoms dissolved in a solvent.

9. A parasiticidal composition comprising the reaction product of a mercapto acetic acid ester and perchloromethylmercaptan, corresponding to the general formula: $Cl_3CSSCH_2COOR$ wherein R is an alkyl radical having from 2 to 12 carbon atoms contained in an aqueous emulsion.

10. A parasiticidal composition comprising the reaction product of a mercapto acetic acid ester and perchloromethylmercaptan, corresponding to the general formula: $Cl_3CSSCH_2COOR$ wherein R is an alkyl radical having from 2 to 12 carbon atoms admixed with a powdered clay.

11. A parasiticidal composition comprising a compound corresponding to the following formula: $Cl_3CSSCH_2COOC_2H_5$ as the active ingredient, admixed with an emulsifying agent which lowers the surface tension of water and thereby promotes aqueous emulsions of the active ingredient.

12. A parasiticidal composition comprising a compound corresponding to the following formula: $Cl_3CSSCH_2COOC_{12}H_{25}$ as the active ingredient, admixed with an emulsifying agent which lowers the surface tension of water and thereby promotes aqueous emulsions of the active ingredient.

ROGER S. HAWLEY.

No references cited.